US008875980B2

(12) United States Patent
Saito et al.

(10) Patent No.: US 8,875,980 B2
(45) Date of Patent: Nov. 4, 2014

(54) FRICTION STIR WELDING APPARATUS (75) Inventors: Hiroshi Saito, Yokohama (JP); Naoki Oiwa, Yokohama (JP); Rie Sakamoto, Tokyo (JP); Tadafumi Kanayama, Chita (JP); Satoshi Yamanaka, Chita (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 13/882,261

(22) PCT Filed: Nov. 4, 2011

(86) PCT No.: PCT/JP2011/075429
§ 371 (c)(1),
(2), (4) Date: Apr. 29, 2013

(87) PCT Pub. No.: WO2012/060439
PCT Pub. Date: May 10, 2012

(65) Prior Publication Data
US 2013/0221069 A1  Aug. 29, 2013

(30) Foreign Application Priority Data
Nov. 4, 2010 (JP) .................................. 2010-247811

(51) Int. Cl.
*B23K 20/12* (2006.01)

(52) U.S. Cl.
CPC ............... *B23K 20/12* (2013.01); *B23K 20/123* (2013.01); *B23K 20/1225* (2013.01); *B23K 20/122* (2013.01); *B23K 20/1245* (2013.01); *B23K 20/1285* (2013.01); *B23K 20/1205* (2013.01); *B23K 20/125* (2013.01); *B23K 20/126* (2013.01)
USPC .......... 228/112.1; 228/113; 228/114; 228/2.1

(58) Field of Classification Search
CPC .. B23K 20/12; B23K 20/1205; B23K 20/122; B23K 20/1225; B23K 20/123; B23K 20/1245; B23K 20/125; B23K 20/1255; B23K 20/126; B23K 20/127; B23K 20/1285; B23K 20/0282; B23K 20/0294
USPC ................. 228/112.1, 113, 114, 2.1
See application file for complete search history.

(56) References Cited

U.S. PATENT DOCUMENTS

| 3,816,696 A * | 6/1974 | Wheeler et al. ........... 219/124.21 |
| 2007/0000972 A1* | 1/2007 | Koga et al. ................. 228/112.1 |

(Continued)

FOREIGN PATENT DOCUMENTS

| JP | 63-107547 | 7/1988 |
| JP | 1-163484 | 6/1989 |

(Continued)

OTHER PUBLICATIONS

JP 2005074451 A english computer translation.*

(Continued)

*Primary Examiner* — Erin Saad
(74) *Attorney, Agent, or Firm* — Ostrolenk Faber LLP (57) ABSTRACT In a friction stir welding apparatus, workpiece fixing surface plates (3a, 3b) are installed on a framework (1). In addition, a welding apparatus main body (8) including a bobbin tool (5) having a probe (5a) protruding upward from a gap (4), a spindle (6) configured to attach the bobbin tool (5) to an upper end section thereof, and a spindle driving apparatus (7) configured to pivot the spindle (6) is movably installed at the framework (1) in a longitudinal direction of the gap (4) via linear guide mechanisms (9) installed at both sides of the welding apparatus main body (8). Further, a moving apparatus (10) is installed to move the welding apparatus main body (8) in the longitudinal direction of the gap (4). According to the friction stir welding apparatus, since the welding apparatus main body (8) is supported by the framework (1) via both of the linear guide mechanisms (9), a large welding reaction force can be sufficiently received. In addition, since workpieces (2a, 2b) are welded from a lower side, the workpiece size is not limited by a size of the apparatus.

9 Claims, 6 Drawing Sheets

(56) References Cited

U.S. PATENT DOCUMENTS

| | | | |
|---|---|---|---|
| 2009/0050672 A1* | 2/2009 | Waldron et al. | 228/2.1 |
| 2010/0147925 A1* | 6/2010 | Hanlon et al. | 228/112.1 |
| 2010/0213242 A1* | 8/2010 | Fujimoto et al. | 228/2.1 |
| 2012/0074203 A1* | 3/2012 | Dagenais | 228/7 |
| 2013/0248506 A1* | 9/2013 | Dagenais | 219/136 |

FOREIGN PATENT DOCUMENTS

| | | |
|---|---|---|
| JP | 3-059518 | 6/1991 |
| JP | 7-505090 | 6/1995 |
| JP | 10-052770 | 2/1998 |
| JP | 10-156556 | 6/1998 |
| JP | 10-156557 | 6/1998 |
| JP | 11-033751 | 2/1999 |
| JP | 2000-033484 | 2/2000 |
| JP | 2000-061658 | 2/2000 |
| JP | 2003-181656 | 7/2003 |
| JP | 2004-090087 | 3/2004 |
| JP | 2004-114138 | 4/2004 |
| JP | 2004-130326 | 4/2004 |
| JP | 2004-195549 | 7/2004 |
| JP | 2005-074451 | 3/2005 |
| JP | 2005074451 A * | 3/2005 |
| JP | 2005-186084 | 7/2005 |
| JP | 2005-219092 | 8/2005 |
| JP | 2007-000876 | 1/2007 |
| JP | 2007-084067 | 4/2007 |
| JP | 2007-130646 | 5/2007 |
| JP | 2010-214401 | 9/2010 |
| WO | WO 93/10935 | 6/1993 |
| WO | WO 2006/081819 A1 | 8/2006 |
| WO | WO 2009/056759 A2 | 5/2009 |

OTHER PUBLICATIONS

JP11-033751 A english computer translation.*

Notification (Information Statement) dated Jul. 8, 2014 issued in corresponding Japanese Patent Application No. 2012-541907 with English translation.

Office Action dated Aug. 5, 2014 issued in corresponding Japanese Patent Application No. 2012-541907 with English translation.

* cited by examiner

FRICTION STIR WELDING APPARATUS

CROSS-REFERENCE TO RELATED APPLICATIONS

The present application is a 35 U.S.C. §§371 national phase conversion of PCT/JP2011/075429, filed Nov. 4, 2011, which claims priority to Japanese Patent Application No. 2010-247811, filed Nov. 4, 2010, the contents of which are incorporated herein by reference. The PCT International Application was published in the Japanese language.

TECHNICAL FIELD

The present invention relates to a friction stir welding apparatus used to weld workpieces through friction stirring.

BACKGROUND ART

In friction stir welding, as a probe (a rod-shaped protrusion) installed at a tip section of a friction stir welding tool is rotated and pushed to a junction of workpieces to be merged into the workpieces, frictional heat is generated at the junction of the workpieces to soften the workpieces, causing plastic flow of the peripheries of the junction and a rotational force of the friction stir welding tool stir mixes the plastic flow to integrally weld the plurality of workpieces. At the present time, friction stir welding is mainly used to weld aluminum thin plates (a thickness of 10 mm or less) in which a welding reaction force generated upon the welding is small.

As a conventional friction stir welding apparatus used for the friction stir welding, an apparatus including guide rails installed at both sides of a surface plate on which a workpiece is placed, a portal frame movably installed on the guide rails spanning the surface plate, a base movably cantilever-supported at the portal frame in a widthwise direction of the surface plate, a welding apparatus main body movably cantilever-supported at the base in an upward/downward direction, and a friction stir welding tool rotatably attached to a lower end section of the welding apparatus main body is proposed (for example, see Japanese Patent Application, First publication No. 2004-195549).

In addition, as another example of the conventional friction stir welding apparatus, an apparatus in which a welding apparatus main body having a friction stir welding tool and a rotary driving unit configured to rotatably drive the friction stir welding tool and a displacement driving unit configured to move the friction stir welding tool in an upward/downward direction is mounted on a self-propelled vehicle body including wheels and a wheel rotating unit configured to rotatably drive the wheels is proposed (for example, see Japanese Patent Application, First publication No. 2005-186084).

SUMMARY OF THE INVENTION

Problems to be Solved by the Invention

However, in the friction stir welding apparatus disclosed in Japanese Patent Application, First publication No. 2004-195549 having a structure configured to cantilever-support the welding apparatus main body, when the welding reaction force generated upon the friction stir welding is large, for example, when the welding reaction force exceeds about 1 ton upon welding of thick plates (for example, 18 mm or more in a aluminum material), such a large welding reaction force cannot be received, and the friction stir welding of the workpieces cannot be performed normally. In addition, since the portal frame has a structure spanning the workpieces, the size (width dimension) of the workpieces that can be welded through friction stirring is limited by the size of the portal frame, and the apparatus should be increased in size when the workpiece size is large.

In addition, in the friction stir welding apparatus disclosed in Japanese Patent Application, First publication No. 2005-186084 that is self-propelled using the wheels, when the welding reaction force generated upon the friction stir welding is large, a running direction is shaken by the welding reaction force, and the friction stir welding of the workpieces cannot be performed normally. In addition, in Japanese Patent Application, First publication No. 2005-186084, while a structure in which a guide member extending along a welding line between the workpieces is installed at one side of the friction stir welding apparatus, a guide mechanism including a pair of rollers configured to sandwich the guide member and a fixing section configured to rotatably support the rollers is installed at the friction stir welding apparatus, and the friction stir welding apparatus is moved along the guide member is also proposed, the pair of rollers installed at the friction stir welding apparatus cannot receive the large welding reaction force generated upon the friction stir welding. Accordingly, even in this case, the friction stir welding of the workpieces cannot be performed normally.

Here, the present invention provides a friction stir welding apparatus capable of performing friction stir welding of workpieces normally without increasing the size of the apparatus even when the size of the workpieces is large or even when a welding reaction force upon the friction stir welding is large.

Means for Solving the Problems

In order to solve the problems, a friction stir welding apparatus according to the present invention includes a welding apparatus main body including a framework having a length larger than that of a welding line along which workpieces are welded, a pair of workpiece fixing surface plates installed to form a gap extending along the welding line between the workpieces on an upper surface of the framework, a friction stir welding tool disposed under the gap and protruding upward from the gap, a spindle configured to attach the friction stir welding tool to an upper end section thereof, and a spindle rotary driving apparatus configured to rotate the spindle; a linear guide mechanism configured to movably support the welding apparatus main body along the gap; and a moving apparatus configured to move the welding apparatus main body along the gap.

In addition, the linear guide mechanism may include a roller circulation type linear guide block installed at the welding apparatus main body, and a linear guide rail installed at the framework to correspond to the linear guide block and extending along the gap.

In this case, the linear guide mechanism may include the plurality of linear guide rails installed in parallel at the framework. In addition, the linear guide mechanism may support the welding apparatus main body via the plurality of linear guide blocks per one linear guide rail.

Further, the friction stir welding tool may be a bobbin tool, and a resilient body configured to support the friction stir welding tool may be installed between the friction stir welding tool and the spindle.

Furthermore, a casing configured to form an oil cooling space may be installed at an outer circumferential side of the spindle of the welding apparatus main body, the spindle may be rotatably supported by the casing via a bearing, and lubricant may be circulated through the bearing and the oil cooling space.

In addition, a cooling nozzle configured to vary an ejecting direction of a gas to cool the outer circumferential side of the friction stir welding tool may be installed at the welding apparatus main body.

Effects of the Invention

In the friction stir welding apparatus according to the present invention, a pair of workpiece fixing surface plates are installed on an upper surface of a framework having a length larger than that of a welding line, along which workpieces are welded, to form a gap extending along the welding line between the workpieces between the workpiece fixing surface plates. In addition, a welding apparatus main body includes a friction stir welding tool protruding upward from the gap, a spindle configured to attach the friction stir welding tool to an upper end section thereof, and a spindle rotary driving apparatus configured to rotate the spindle and movably installed under the gap in the framework along the gap via the linear guide mechanisms, and further, a moving apparatus configured to move the welding apparatus main body along the gap is installed. According to the above-mentioned configuration, when a welding reaction force generated upon the friction stir welding is large, for example, even when a welding reaction force upon the friction stir welding or the like of thick plates (for example, 18 mm or more in the case of an aluminum material) exceeds 1 ton, the large welding reaction force can be sufficiently received. Accordingly, the friction stir welding of the workpieces can be performed normally. In addition, since the workpieces placed on the workpiece fixing surface plates on the framework are welded through friction stirring by the welding apparatus main body disposed under the gap formed between the workpiece fixing surface plates, even when a width of the workpieces is larger than that of the workpiece fixing surface plates, the friction stir welding of the workpieces can be performed.

DESCRIPTION OF EMBODIMENTS

Hereinafter, embodiments of the present invention will be described with reference to the accompanying drawings.

FIGS. 1 to 6 show an embodiment of the present invention. In a friction stir welding apparatus, a framework 1 is configured by installing a pair of left and right frames 1b and 1b disposed in parallel in a longitudinal direction of a base plate 1c on the base plate 1c extending in a direction in which a friction stir welding tool 5 moves during friction stir welding (hereinafter referred to as a forward/rearward direction) at predetermined intervals, and a pair of workpiece fixing surface plates 3a and 3b having upper surfaces on which workpieces 2a and 2b are placed are installed at upper end surfaces of the frames 1b and 1b, respectively. Both upper surfaces of the workpiece fixing surface plates 3a and 3b are held horizontally and slit-shaped gaps 4 extending in the forward/rearward direction and having a predetermined interval are formed between the fixing surface plates 3a and 3b. Then, a space section 1a surrounded by the base plate 1c, the left and right frames 1b and the left and right workpiece fixing surface plates 3a and 3b is formed under the gap 4.

A welding apparatus main body 8 including the friction stir welding tool 5 having a bobbin shape, a spindle 6 having the friction stir welding tool 5 at an upper end section and extending in a vertical direction, and a spindle rotary driving apparatus 7 configured to rotate the friction stir welding tool 5 via the spindle 6, is accommodated in the space section 1a. In addition, linear guide blocks 26 installed at both of left and right side surfaces of the welding apparatus main body 8 are engaged with linear guide rails 27 installed at both of left and right side sections (in a widthwise direction of the base plate 1c) of the base plate 1c, respectively. Then, the welding apparatus main body 8 is movable in a forward/rearward direction, which is a longitudinal direction of the base plate 1c in a state in which the friction stir welding tool 5 protrudes upward from the gap 4, by a linear guide mechanism 9 constituted by the linear guide blocks 26 and the linear guide rails 27.

Further, a moving apparatus 10 is installed at the space section 1a. The moving apparatus 10 includes an endless winch 29 installed at an upper surface of one end side in the forward/rearward direction of the base plate 1c, a sheave 30 installed under a drum 29a of the endless winch 29, a sheave block 28 installed at an upper surface of the other end side in the forward/rearward direction of the base plate 1c, and a wire rope 31, which is a strand-shaped member, wound on the drum 29a of the endless winch 29 and wound and taken by the sheave 30 and the sheave block 28. Then, both ends of the wire rope 31 are connected to both of front and rear end sections of the welding apparatus main body 8, the welding apparatus main body 8 is moved in the forward/rearward direction via the wire rope 31 by rotation of the endless winch 29, and thus the friction stir welding tool 5 moves along the slit-shaped gaps 4 between the workpiece fixing surface plates 3a and 3b.

Specifically, the pair of left and right workpiece fixing surface plates 3a and 3b placed and attached to upper ends of the left and right frames 1b constituting the framework 1 are formed in parallel such that a width of the gap 4 formed therebetween is constant in a widthwise direction perpendicular to the longitudinal direction of the base plate 1c. In addition, an interval (the width of the gap 4) of the left and right workpiece fixing surface plates 3a and 3b is set such that the friction stir welding tool 5 inserted into the gap 4 from a lower side thereof can move in the gap 4 in the forward/rearward direction with no interference.

The workpieces 2a and 2b to be welded are placed on the upper surfaces of the workpiece fixing surface plates 3a and 3b. In this case, both of the workpieces 2a and 2b are fixed onto the workpiece fixing surface plates 3a and 3b at positions on which the welding side end surfaces thereof approach each other over the gap 4.

Figure 3:
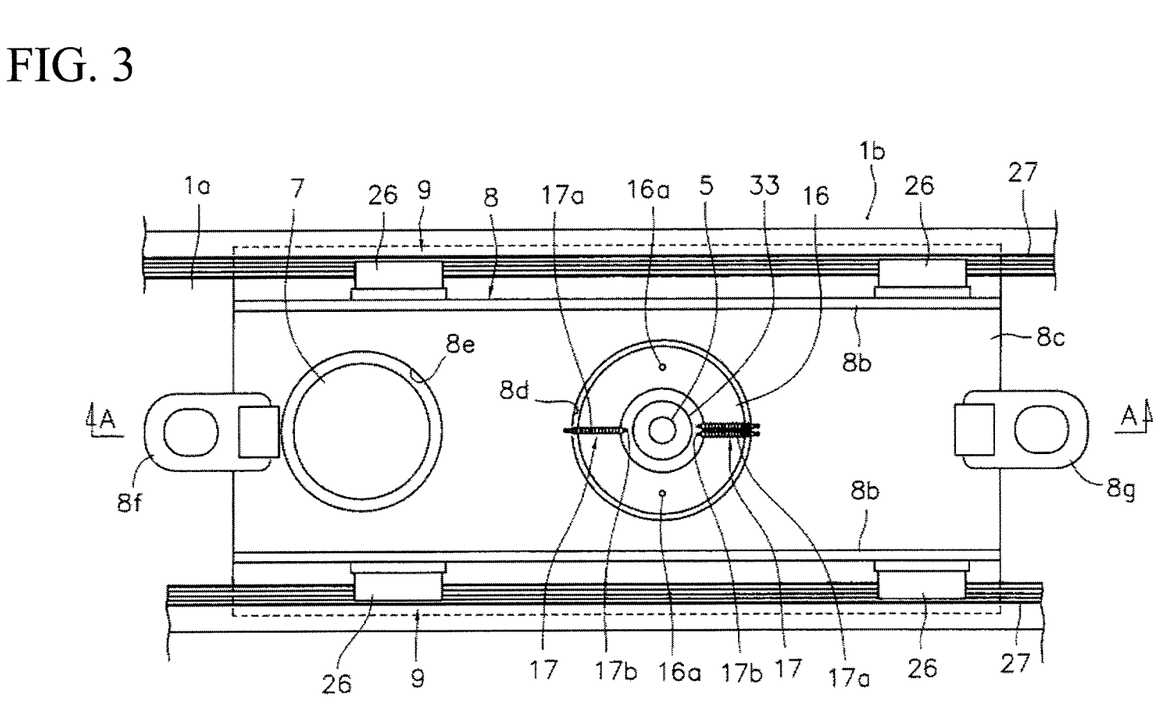
FIG. 3 is a schematic plan view showing an installation state at a base of a welding apparatus main body.

In addition, the welding apparatus main body 8 forms a prismatic case by fixing left and right sidewalls 8b and 8b on a rectangular bottom plate 8a extending in the longitudinal direction of the framework 1 with lower ends of the sidewalls 8b and 8b spaced a predetermined interval from each other and disposed on the bottom plate 8a in a vertically standing state, and further, by horizontally attaching a ceiling wall 8c having substantially the same length as the bottom plate 8a and a smaller width than the bottom plate 8a to the inside of the upper end sections of the left and right sidewalls 8b and 8b. The welding apparatus main body 8 has a size that can be accommodated in the space section 1a. In addition, as shown in FIG. 3, openings 8d and 8e having a predetermined size are formed at two front and rear places of the ceiling wall 8c.

In this case, the spindle 6 extending in the upward/downward direction, a welding tool support mechanism 13 (see FIG. 6) installed between an upper end of the spindle 6 and a lower end of a shaft section 5b of a bobbin tool 5, a substantially cylindrical casing 16 configured to form an oil cooling space 15 at an outer circumferential side of the spindle 6, bearings 23 and 24 configured to rotatably support an upper end section and a lower end section of the spindle 6 at the casing 16, a cooling nozzle 17 configured to eject a gas to cool an outer circumferential side of the bobbin tool 5, and the spindle rotary driving apparatus 7 such as an AC servo motor, or the like, are provided.

In addition, a substantially cylindrical tool holder 12 is concentrically attached to an upper end of the spindle 6. The tool holder 12 concentrically accommodates the shaft section 5b of the bobbin tool 5 used as a friction stir welding tool and having a fixed shoulder interval, and transmits power to the bobbin tool 5 via a sliding key 11.

Further, the lower end section of the spindle 6 and a downward output shaft 7a of the spindle rotary driving apparatus 7 protrude downward from an opening formed in the bottom plate 8a of the case. In addition, a spindle rotary driving mechanism 14 is installed under the bottom plate 8a of the case. The spindle rotary driving mechanism 14 winds and hangs a V belt 22 between a V pulley 20 attached to the output shaft 7a of the spindle rotary driving apparatus 7 and a V pulley 21 attached to the lower end section of the spindle 6, and rotatably drives the spindle 6 by driving of the spindle rotary driving apparatus 7.

Furthermore, the upper end sections of the spindle 6 and the casing 16 are fitted into an opening 8d of the ceiling wall 8c of the case from a lower side thereof, and the tool holder 12 and the friction stir welding tool 5 are supported by the upper end section of the spindle 6 that protrudes over the ceiling wall 8c via the opening 8d. In addition, the upper end section of the spindle rotary driving apparatus 7 is fitted into an opening 8e of the ceiling wall 8c.

According to the above-mentioned configuration, the welding apparatus main body 8 is movable in a longitudinal direction (a forward/rearward direction) of the gap 4 via the roller circulation type linear guide mechanisms 9 installed at the upper end section and the lower end section of both of left and right sidewalls 8b, respectively. In addition, as a probe 5a of the bobbin tool 5 protruding from the gap 4 between the workpiece fixing surface plates 3a and 3b travels along a length of the workpiece fixing surface plates 3a and 3b forming the gap 4, the probe 5a being disposed between the workpieces 2a and 2b shown by a two-dot chain line in the drawing, the friction stir welding of the workpieces 2a and 2b can be performed.

Here, a structure of a junction area of the bobbin tool 5 and the spindle 6 will be described in more detail.

Figure 6:
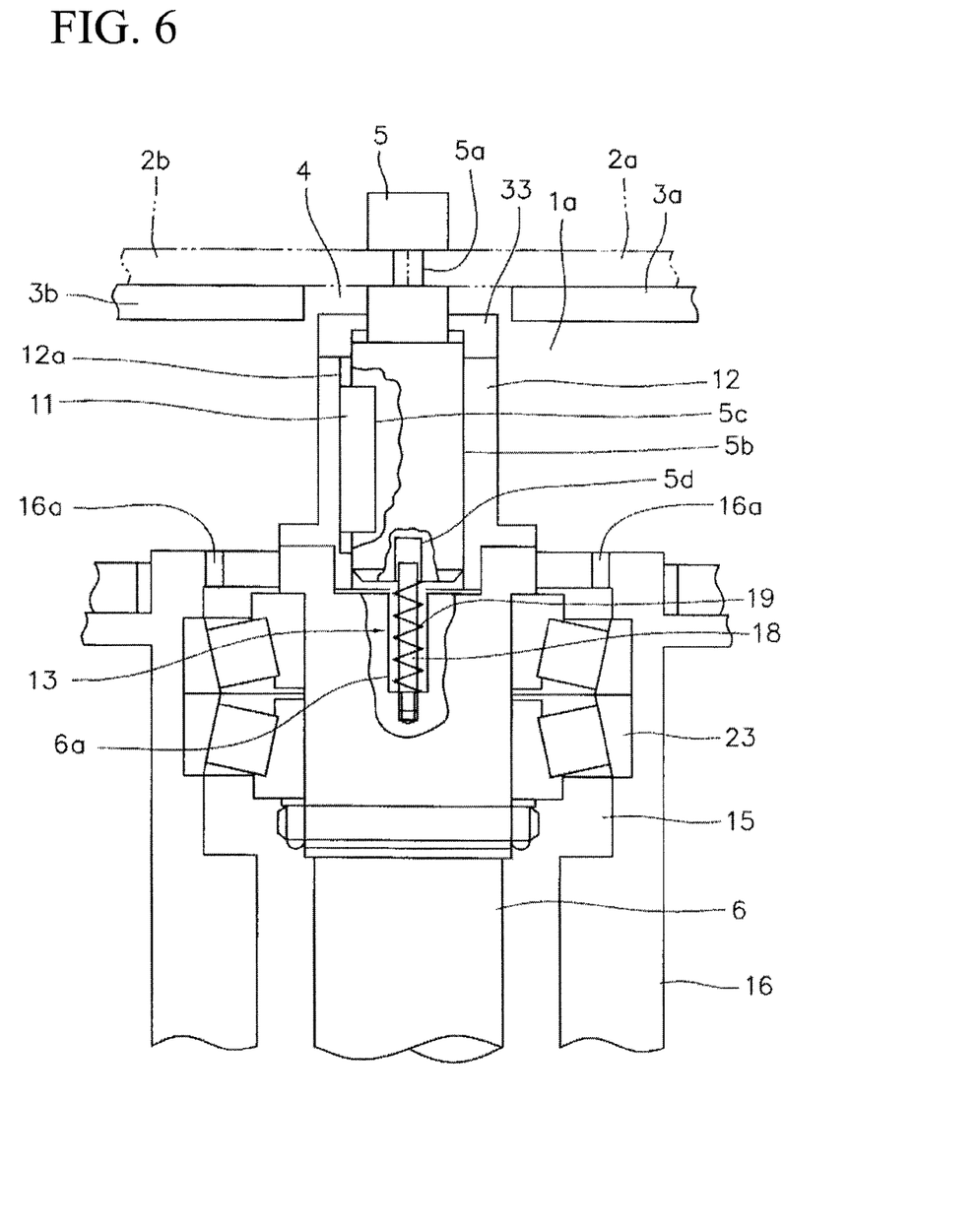
FIG. 6 is an enlarged view of a portion X of FIG. 5.

As shown in FIG. 6, a predetermined length of a key groove 12a in communication with an upper end of the tool holder 12 is vertically formed in the inner circumferential surface of the tool holder 12. In addition, a key groove 5c having a length smaller than that of the key groove 12a of the tool holder 12 is vertically formed in the outer circumferential surface of the shaft section 5b disposed at a base end side (a lower side) of the bobbin tool 5, and the sliding key 11 is fixed into the key groove 5c. Then, as the shaft section 5b of the bobbin tool 5 is accommodated in the tool holder 12 such that the sliding key 11 is fitted into the key groove 12a, a rotational force of the spindle 6 for the friction stir welding of the workpieces 2a and 2b can be transmitted to the bobbin tool 5 via the tool holder 12 and the sliding key 11. In addition, since the sliding key 11 has a length shorter than that of the key groove 12a, the bobbin tool 5 can vertically slide along the inside of the tool holder 12.

Further, a spring support post fixing hole 6a extending downward to a predetermined depth is formed in a central portion of the upper end of the spindle 6. An upwardly extending columnar spring support post 18 is fixed to a bottom portion of the fixing hole 6a to be concentric to the fixing hole 6a. The upper end of the spring support post 18 protrudes upward from the upper end of the fixing hole 6a, and the spring 19 serving as a resilient body configured to support the bobbin tool 5 is concentrically installed around the spring support post 18. In addition, a spring support post insertion hole 5d into which the upper end section of the spring support post 18 is inserted is formed in a central portion of the lower end surface of the shaft section 5b of the bobbin tool 5. The upper end section of the spring support post 18 is inserted into the insertion hole 5d and the lower end surface of the shaft section 5b of the bobbin tool 5 abuts an upper end of a spring 19, and as a result, a gap in the upward/downward direction is formed between the upper end of the spindle 6 and the lower end of the shaft section 5b of the bobbin tool 5. Then, according to the above-mentioned configuration, the bobbin tool 5 is supported by the welding tool support mechanism 13 configured to absorb the weight of the bobbin tool 5 by the spring 19 and support the weight from the lower side thereof. Even when the workpieces 2a and 2b are deformed in the upward/downward direction (a plate thickness direction) by the welding tool support mechanism 13, according to the deformation, the bobbin tool 5 can be smoothly raised and lowered as the friction stir welding tool from under the workpieces 2a and 2b upon the friction stir welding.

Figure 4:
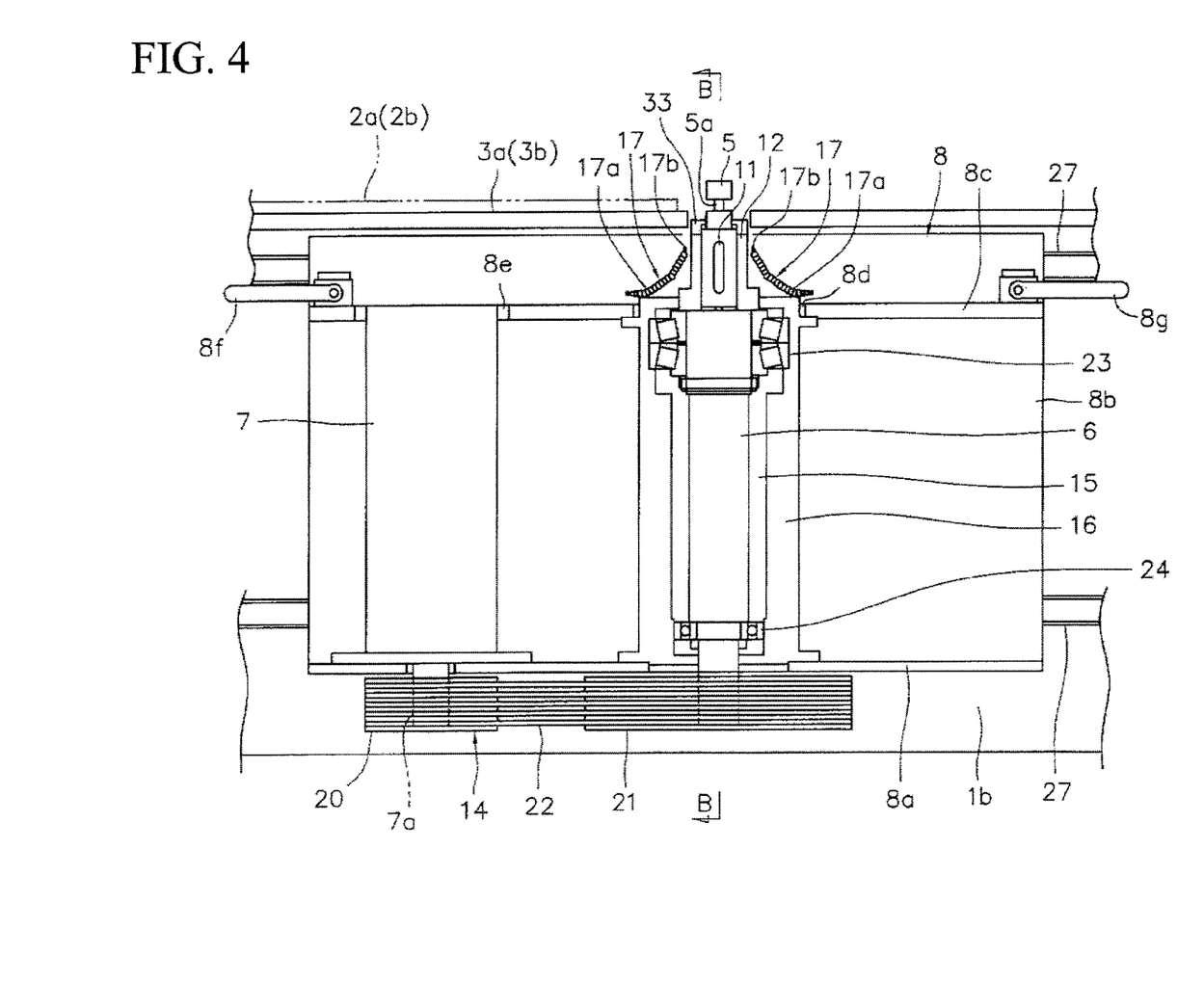
FIG. 4 is a schematic cross-sectional view taken along line A-A of FIG. 3.
Figure 5:
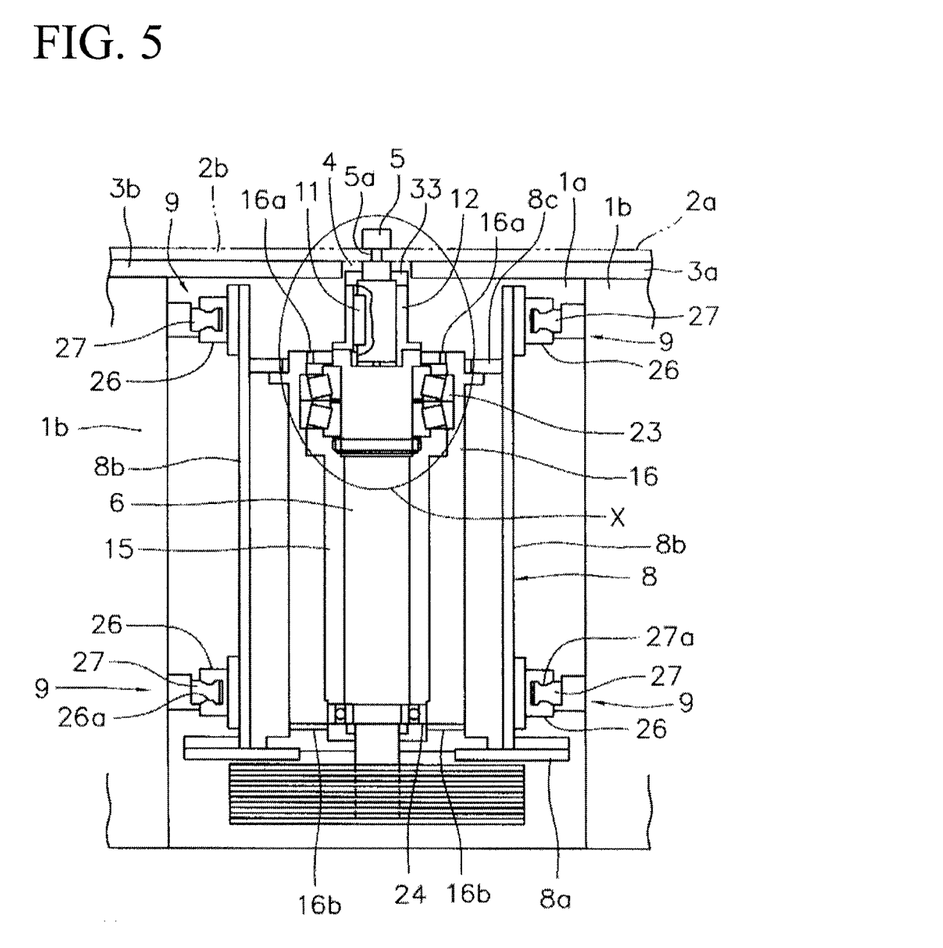
FIG. 5 is a schematic cross-sectional view taken along line B-B of FIG. 4.

In addition, as shown in FIGS. 3 and 5, a lubricant inlet port 16a into which lubricant flows is formed in the upper end section of the casing 16, and a lubricant discharge port 16b through which the lubricant is discharged is formed in the lower end section of the casing 16. Further, a space in which a bearing 23 such as a conic roller bearing and a separate kind of bearing 24 are installed is formed as the oil cooling space 15 between the inside of the casing 16 and the spindle 6. Then, when the lubricant in a lubricant tank 25 installed on the base plate 1c is pumped by a lubricant circulating apparatus such as an oil pump (not shown), the lubricant flows sequentially through the bearing 23 at the upper end section of the spindle 6, the oil cooling space 15 at the outer circumferential side of the spindle 6, and the bearing 24 at the lower end section of the spindle 6 from the lubricant inlet port 16a installed at the upper end section of the casing 16, and thus lubrication of the bearings 23 and 24 and cooling of the spindle 6 are performed. The lubricant returns to the lubricant tank 25 via the lubricant discharge port 16b installed at the lower end section of the casing 16 to be used for lubrication and cooling again. In addition, as shown in FIGS. 3 and 4, the plurality of cooling nozzles 17 configured to cool the bobbin tool 5 are installed at an upper portion of the welding apparatus main body 8 (in the drawing, a total of three cooling nozzles 17 are installed in the front and rear of the tool holder 12). The cooling nozzles 17 include a predetermined length of a bellows section 17a having a base end section, to which a gas supply source (not shown) is connected, and a gas ejection section 17b installed at a tip side of the bellows section 17a, to eject a gas, for example, air, from the gas supply source, and cool the bobbin tool 5, in a state in which the gas ejection section 17b is directed to an arbitrary position of the outer circumferential side of the bobbin tool 5, i.e., the outer circumferential side of the tool holder 12 at the bellows section 17*a* is curved.

As shown in FIGS. 3 and 5, the linear guide mechanisms 9 are installed at the upper end section and the lower end section between both side sections of the welding apparatus main body 8 and the left and right frames 1*b* of the framework 1, respectively, and movably support the welding apparatus main body 8 in the forward/rearward direction. The linear guide mechanisms 9 include roller circulation type linear guide blocks 26 installed at side sections of the welding apparatus main body 8, and linear guide rails 27 having high stiffness installed in the upper end sections and lower end sections of the frame 1*b* throughout the entire length in the longitudinal direction at positions corresponding to the linear guide blocks 26 at the side sections of the welding apparatus main body 8. In the case of the embodiment, a total of eight linear guide blocks 26 having a cross-sectional shape as shown in the drawing are installed at the front end sides and the rear end sides in the upper end sections and the lower end sections of both of the side sections of the welding apparatus main body 8. In addition, a total of four linear guide rails 27 having a cross-sectional shape as shown in the drawing are installed in pairs on each side at positions corresponding to the linear guide blocks 26 at the upper end sections and the lower end sections of the frames 1*b* of the framework 1. Further, two linear guide blocks 26 are disposed in the front and rear of each of the linear guide rails 27.

As shown in FIG. 5, substantially V-shaped grooves 27*a* are formed in an upper surface and a lower surface of the linear guide rail 27. In addition, a projection 26*a* fitted into the groove 27*a* is formed at the linear guide block 26, and columnar members (not shown) are rotatably installed as a plurality of rolling elements abutting substantially V-shaped inclined surfaces of the groove 27*a* at inclined surfaces of the projection 26*a* of the linear guide block 26 around a shaft perpendicular to a moving direction of the welding apparatus main body 8 (an extending direction of the linear guide rail 27).

As the linear guide block 26 having the above-mentioned configuration is provided, the large welding reaction force generated in a widthwise direction of a framework 1 upon the friction stir welding can be received by the framework 1 via the linear guide blocks 26 of both sides of the welding apparatus main body 8.

The moving apparatus 10 horizontally moves the spindle 6 by moving the welding apparatus main body 8 along the linear guide rail 27 in the framework 1. As described above, the moving apparatus 10 includes the endless winch 29 driven by the driving apparatus such as an AC servo motor installed on the upper surface of the one end side in the longitudinal direction of the base plate 1*c* of the framework 1, the sheave block 28 having sheaves 28*a* vertically disposed in two stages and installed on the upper surface of the other end side in the longitudinal direction of the base plate 1*c*, the sheave 30 installed under the drum 29*a* of the endless winch 29, and the wire rope 31 wound on the drum 29*a* of the endless winch 29.

Figure 2:
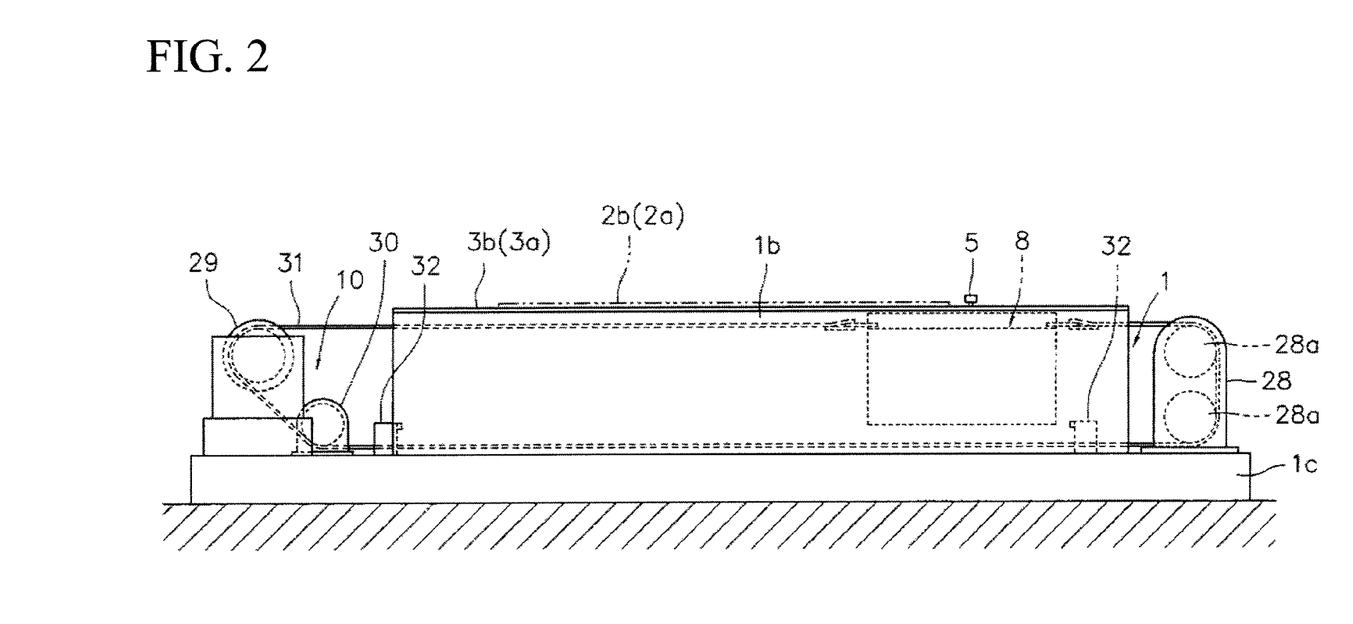
FIG. 2 is a schematic front view of FIG. 1.

As shown in FIGS. 3 and 4, one end of the wire rope 31 wound on the drum 29*a* of the endless winch 29 is connected to an eye plate 8*f*, which is a connecting tool that is vertically rotatably attached to the upper surface of the ceiling wall 8*c* of the one end side in the moving direction of the welding apparatus main body 8. In addition, as shown in FIG. 2, the other end of the wire rope 31 wound on the drum 29*a* of the endless winch 29 is hung by the sheave 30 in a sequence from the sheave 28*a* of the lower side of the sheave block 28 to the sheave 28*a* of the upper side, and further, as shown in FIGS. 3 and 4, connected to an eye plate 8*g*, which is a connecting tool that is vertically rotatably attached to the upper surface of the ceiling wall 8*c* of the other end side in the moving direction of the welding apparatus main body 8. Accordingly, the wire rope 31 is wound and hung between the sheave block 28 and the endless winch 29 in an endless manner.

Figure 1:
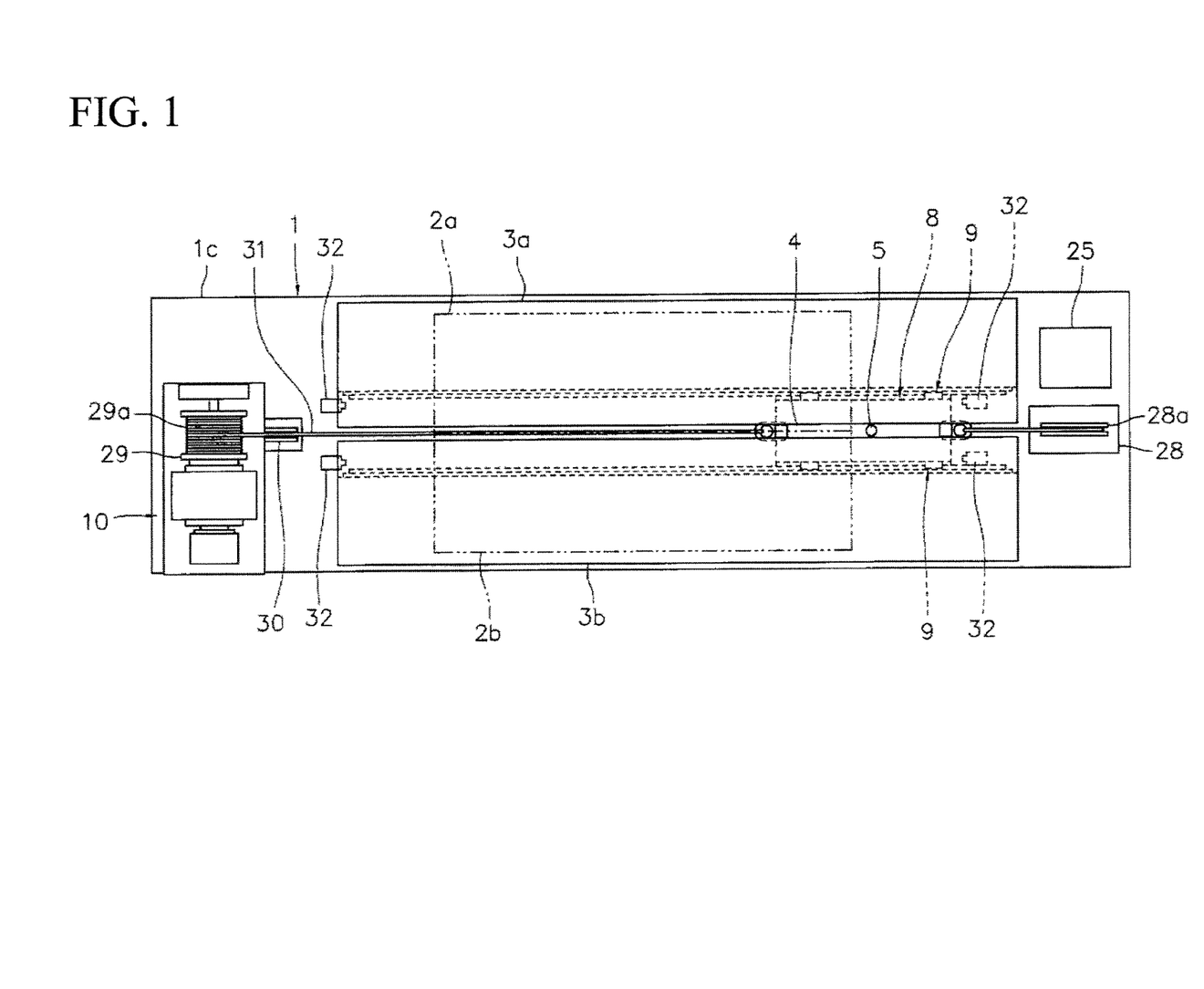
FIG. 1 is a schematic plan view showing an embodiment of a friction stir welding apparatus of the present invention.

In FIG. 2, when the drum 29*a* of the endless winch 29 is rotated in one direction to move the wire rope 31 counterclockwise, the spindle 6 of the welding apparatus main body 8 moves toward the endless winch 29 in FIG. 1. On the other hand, when the drum 29*a* of the endless winch 29 is rotated in a reverse direction of the above-mentioned direction and moves the wire clockwise in FIG. 2, the spindle 6 of the welding apparatus main body 8 moves toward the sheave block 28 in FIG. 1. Then, the probe 5*a* of the bobbin tool 5 is disposed between the workpieces 2*a* and 2*b* fixed to the workpiece fixing surface plates 3*a* and 3*b*, and in this state, the spindle 6 is rotated by driving of the spindle rotary driving apparatus 7 to rotate the bobbin tool 5, which is a friction stir welding tool, and thus junctions of the workpieces 2*a* and 2*b* can be welded through friction stirring from a lower side thereof.

In addition, in the drawings, reference numeral 32 designates a welding apparatus main body overrun prevention damper installed at both end sections of a moving path of the welding apparatus main body 8, and reference numeral 33 designates an extraction prevention cover for the bobbin tool 5, which is attached to the upper end section of the tool holder 12.

For example, when the friction stir welding of a thick plate (18 mm or more) formed of an aluminum material is performed using the friction stir welding apparatus of the present invention having the above-mentioned configuration, as shown in FIGS. 1 and 2, the welding apparatus main body 8 is initially on standby in a state moved to the end section of the sheave block 28 side, which is one end in the longitudinal direction in the framework 1. Next, the workpieces 2*a* and 2*b* are placed on the left and right workpiece fixing surface plates 3*a* and 3*b* of the framework 1, respectively, and welding lines of the workpieces 2*a* and 2*b* are matched to a center of the gap 4 using a positioning jig (not shown). When the welding lines of the workpieces 2*a* and 2*b* placed on the upper surfaces of the workpiece fixing surface plates 3*a* and 3*b* are matched to the center of the gap 4, the workpieces 2*a* and 2*b* are fixed to the workpiece fixing surface plates 3*a* and 3*b* by a workpiece fixing jig (not shown). After that, a scattering prevention jig such as a steel channel (not shown) disposed along the entire length of the workpieces 2*a* and 2*b* is installed on the workpieces 2*a* and 2*b* to cover the welding line, preventing scattering due to damage to the bobbin tool 5. Here, when the workpieces 2*a* and 2*b* are larger and largely protrude in a widthwise direction from the upper surfaces of the workpiece fixing surface plates 3*a* and 3*b* of the framework 1, workpiece supports (not shown) configured to support the workpieces 2*a* and 2*b* are installed at both sides in the widthwise direction of the framework 1, and the portions of the workpieces 2*a* and 2*b* protruding from the framework 1 are supported by the workpiece supports and fixed by a workpiece fixing jig (not shown).

After the workpieces 2*a* and 2*b* are fixed onto the workpiece fixing surface plates 3*a* and 3*b*, as described above, the endless winch 29 constituting the moving apparatus 10 is driven to pull the welding apparatus main body 8 via the wire rope 31, and the bobbin tool 5 is moved toward the endless winch 29 from the position shown in FIG. 1 together with the spindle 6. After moving the spindle 6 to a position just before a welding start position of the workpieces 2*a* and 2*b*, the spindle 6 is slowly moved until the probe 5*a* of the bobbin tool 5 protruding upward from between the gaps 4 is hung by (abuts) the end surfaces of the workpieces 2a and 2b, and the spindle 6 is rotated by the spindle rotary driving apparatus 7 in a step in which the probe 5a of the bobbin tool 5 is hung by the end surfaces of the workpieces 2a and 2b. In addition, in connection with rotation of the spindle 6, circulation of the lubricant to the bearings 23 and 24 and the oil cooling space 15 at the outer circumferential side of the spindle 6 by the lubricant circulating apparatus (not shown) and ejection of the gas, for example, air, from the cooling nozzle 17 are started. Here, a notch may be formed at one end of a welding side of the workpieces 2a and 2b (an end closest to the sheave block 28 side), which becomes the welding start position of the workpieces 2a and 2b, such that the probe 5a of the bobbin tool 5 is easily hung by the workpieces 2a and 2b.

Next, after a predetermined time elapses from the rotation of the spindle 6 by the spindle rotary driving apparatus 7, the movement is resumed so that the welding apparatus main body 8 is pulled toward the endless winch 29 via the wire rope 31 through driving of the endless winch 29, and the friction stir welding of the workpieces 2a and 2b is performed from one end of the welding line between the workpieces 2a and 2b to the other end of the workpiece welding line (an end closest to the endless winch 29 side), which becomes a welding termination position.

Next, it is determined that the welding of the workpieces 2a and 2b to the welding termination position is completed, and movement of the spindle 6 of the welding apparatus main body 8 is stopped. Next, after it is determined that the rotation of the spindle 6 is stopped and a temperature around the workpieces 2a and 2b is lowered, the fixing is released by the workpiece fixing jig (not shown) of the workpieces 2a and 2b, collection of the welded workpieces 2a and 2b is performed, and the friction stir welding is terminated.

As described above, in the friction stir welding apparatus of the present invention, the workpiece fixing surface plates 3a and 3b, the two of which form one set, configured to place the workpieces 2a and 2b, which are targets for the friction stir welding, on the framework 1 having a hollow structure, are installed such that the gaps 4 extending along the welding line between the workpieces 2a and 2b are formed between the workpiece fixing surface plates 3a and 3b. In addition, the welding apparatus main body 8 including the bobbin tool 5 serving as the friction stir welding tool configured to project the probe 5a upward from the gap 4, the spindle 6 configured to attach the bobbin tool 5 to the upper end section of the spindle 6, and the spindle rotary driving apparatus 7 configured to pivot the spindle 6 is movably attached to the space section 1a under the gaps 4 in the longitudinal direction of the gaps 4 via the roller circulation type linear guide mechanism 9 installed at the upper end section and the lower end section of both of left and right sides of the welding apparatus main body 8. For this reason, when the welding reaction force generated by the friction stir welding is large, for example, even when the welding reaction force exceeds 1 ton upon the friction stir welding of thin plates (for example, formed of an aluminum material of less than 18 mm) or the friction stir welding of thick plates (for example, formed of an aluminum material of 18 mm or more) at a high speed, the large welding reaction force can be substantially received. Accordingly, the friction stir welding of the workpieces 2a and 2b can be performed normally.

In addition, since the workpieces 2a and 2b placed on the workpiece fixing surface plates 3a and 3b on the framework 1 are welded through friction stirring by rotating the bobbin tool 5 protruding upward from the lower side through the gap 4 formed between the workpiece fixing surface plates 3a and 3b, even when the width of the workpieces 2a and 2b is larger than that of the workpiece fixing surface plates 3a and 3b, the friction stir welding of the workpieces 2a and 2b can be performed. Here, since there is no need for the large friction stirring apparatus corresponding to the size (the width) of the workpieces 2a and 2b, reduction in size of the friction stirring apparatus can be attained.

Further, since the spring 19, which is a resilient body, is installed between the lower end of the bobbin tool 5, which is a friction stir welding tool, and the upper end of the spindle 6, in a state in which the weight of the bobbin tool 5 is supported by the spring 19, vertical movement of the bobbin tool 5 becomes possible. For this reason, even when the workpieces 2a and 2b are deformed in the upward/downward direction (the plate thickness direction), the bobbin tool 5 can be smoothly raised and lowered according to the deformation.

Furthermore, since the casing 16 configured to form the oil cooling space 15 at the outer circumferential side of the spindle 6 is formed at the welding apparatus main body 8 outside of the bearings 23 and 24 so that the lubricant is circulated in the bearings 23 and 24 and the oil cooling space 15, the lubrication of the bearings 23 and 24 and cooling of the spindle 6 can be performed by the lubricant.

In addition, since the cooling nozzle 17 including the bellows section 17a having the base end section to which a gas supply source (not shown) is connected and the gas ejection section 17b formed at the tip side of the bellows section 17a and configured to vary an ejecting direction of a gas for cooling the outer circumferential side of the bobbin tool 5 is installed in the welding apparatus main body 8, such that the gas ejection section 17b is directed to the outer circumferential side of the bobbin tool 5, i.e., at an arbitrary position outside of the outer circumferential side of the tool holder 12, the gas, for example, air, from the gas supply source can be ejected to effectively cool the bobbin tool 5.

Further, since the bobbin tool 5 is used as the friction stir welding tool, installation of a displacement driving unit configured to vertically move the friction stir welding tool to add a pressing force to the workpieces 2a and 2b can be omitted. Accordingly, the friction stir welding apparatus can be simplified in structure and reduced in size.

Furthermore, as described above, since the moving apparatus 10 includes the endless winch 29 and the wire rope 31, which is a strand-shaped member, wound on the drum 29a of the endless winch and connecting both ends thereof to both end sections in the moving direction of the welding apparatus main body 8, configured to be driven by a driving apparatus such as an AC servo motor, long-distance conveyance (for example, conveyance of 10 m or more) of the welding apparatus main body 8 can be performed. Accordingly, even when the length of the workpieces 2a and 2b is, for example, 10 m or more, the friction stir welding can be performed. In addition, since the endless winch 29 is used to move the welding apparatus main body 8, in comparison with the case in which the welding apparatus main body 8 is moved using a rack and pinion mechanism, there is no necessity of installation of the rack, and the endless winch is advantageous in maintenance. Further, when the endless winch 29 is used, in comparison with the case in which the welding apparatus main body 8 is moved using a lead screw driving or the rack and pinion mechanism, the endless winch is advantageous even in cost.

In addition, in the embodiment, while the case in which the linear guide mechanism 9 is of roller circulation type has been described, another type of linear guide mechanism may be provided as long as a large reaction force generated upon the friction stir welding of the thick plates can be received. Further, in the embodiment, while a total of eight linear guide blocks 26 are installed at the front end side and the rear end side in the upper end section and the lower end section of both side portions of the welding apparatus main body 8 and a total of four linear guide rails 27 are installed at positions corresponding to the linear guide blocks 26 of the upper end section and the lower end section of the frame 1b of the framework 1 in pairs on each side, the installation positions and number of the linear guide blocks 26 and the number of the linear guide rails 27 with respect to the welding apparatus main body 8 are not particularly limited as long as the above-mentioned large reaction force can be received. Further, in the embodiment, while two linear guide blocks 26 are disposed at each of the linear guide rails 27 in back and to the front, the number of linear guide blocks 26 disposed at one linear guide rail 27 is not particularly limited either as long as the above-mentioned large reaction force can be received.

However, in the structure of the embodiment, in order to obtain an effect, which is an aspect of the present invention capable of receiving a large reaction force, the linear guide mechanism 9 may include the plurality of linear guide rails 27 installed in parallel at the framework 1, and support the welding apparatus main body 8 via the plurality of linear guide blocks 26 per one linear guide rail 27.

In addition, in the embodiment, while the case in which the AC servo motor is applied to the spindle rotary driving apparatus 7 has been described, an inverter motor may be applied as long as conditions such as a revolution number, torque characteristics, or the like, are satisfied, and rotational transmission from the spindle rotary driving apparatus 7 to the spindle 6 may be rotational transmission by gears or chains, instead of V pulleys.

Further, when the endless winch 29 is applied to the moving apparatus 10 configured to move the welding apparatus main body 8, while the above-mentioned advantage is provided, the present invention is not limited to the case of using the endless winch 29 but includes movement by the chain driving or lead screw driving, and movement by the rack and pinion mechanism, as long as the welding apparatus main body 8 can be moved in the longitudinal direction of the gap 4. Otherwise, a chain may be installed and fixed back and forth instead of the rack, and the pinion to which the welding apparatus main body 8 is connected is fitted into the chain to move the welding apparatus main body 8 by rotation of the pinion.

Furthermore, in the embodiment, while the case in which the bobbin tool 5 is applied to the friction stir welding tool has been described, the present invention is not limited thereto but, like the conventional friction stir welding apparatus, a mechanism configured to firmly press the friction stir welding tool against the workpieces 2a and 2b may be provided, and a friction stir welding tool having only one shoulder may be attached to the upper end section of the spindle 6. In addition, in the embodiment, while the case in which the spring 19 configured to absorb the weight of the friction stir welding tool 5 is provided is described, when the weight of the tool is not large, the spring 19 configured to absorb the weight of the tool may be omitted. Further, of course, various modifications can be made without departing the scope of the present invention.

INDUSTRIAL APPLICABILITY

According to the friction stir welding apparatus of the present invention, friction stir welding can be performed even when the size of the workpieces and the welding reaction force are large.

The invention claimed is:

1. A friction stir welding apparatus comprising:
    a welding apparatus main body comprising a framework having a length larger than that of a welding line along which workpieces are welded,
    a pair of workpiece fixing surface plates installed to form a gap extending along the welding line between the workpieces on an upper surface of the framework,
    a friction stir welding tool disposed through the gap and protruding upward from the gap,
    a spindle configured to attach the friction stir welding tool to an upper end section thereof, and
    a spindle rotary driving apparatus configured to pivot the spindle;
    a linear guide mechanism configured to movably support the welding apparatus main body along the gap; and
    a moving apparatus configured to move the welding apparatus main body along the gap,
    wherein the linear guide mechanism comprises a roller circulation linear guide block installed at the welding apparatus main body, and a linear guide rail installed at the framework to correspond to the linear guide block and extending along the gap,
    grooves are formed in an upper surface and a lower surface of the linear guide rail, and projections are formed in an upper surface and a lower surface of the linear guide block, each projection corresponding to a respective groove in the linear guide rail and fitting into the respective groove in the linear guide rail.

2. The friction stir welding apparatus according to claim 1, wherein the linear guide mechanism comprises the plurality of linear guide rails installed in parallel at the framework.

3. The friction stir welding apparatus according to claim 1, wherein the linear guide mechanism supports the welding apparatus main body via the plurality of linear guide blocks per one linear guide rail.

4. The friction stir welding apparatus according to claim 1, wherein the friction stir welding tool is a bobbin tool, and a resilient body configured to support the friction stir welding tool is installed between the friction stir welding tool and the spindle.

5. The friction stir welding apparatus according to claim 1, wherein a casing configured to form an oil cooling space is installed at an outer circumferential side of the spindle of the welding apparatus main body, the spindle is rotatably supported by the casing via a bearing, and lubricant is circulated through the bearing and the oil cooling space.

6. The friction stir welding apparatus according to claim 1, wherein a cooling nozzle configured to vary an ejecting direction of a gas to cool the outer circumferential side of the friction stir welding tool is installed at the welding apparatus main body.

7. The friction stir welding apparatus according to claim 1, wherein the moving apparatus comprises a winch, and a member wound on the winch, a respective end of the member being connected to a respective end section of the welding apparatus main body in a moving direction of the welding apparatus main body, and the welding apparatus main body is moved by driving of the winch.

8. The friction stir welding apparatus according to claim 3, wherein the linear guide mechanism supports the welding apparatus main body via the plurality of linear guide blocks per one linear guide rail.

9. A friction stir welding apparatus comprising:
    a welding apparatus main body comprising a framework having a length larger than that of a welding line along which workpieces are welded, a pair of workpiece fixing surface plates installed to form a gap extending along the welding line between the workpieces on an upper surface of the framework,
a friction stir welding tool disposed through the gap and protruding upward from the gap,
a spindle configured to attach the friction stir welding tool to an upper end section thereof, and
a spindle rotary driving apparatus configured to pivot the spindle;
a linear guide mechanism configured to movably support the welding apparatus main body along the gap; and
a moving apparatus configured to move the welding apparatus main body along the gap,
wherein the linear guide mechanism comprises at least one first roller circulation linear guide block installed on a left sidewall of the welding apparatus main body, at least one second roller circulation linear guide block installed on a right sidewall of the welding apparatus main body, at least one first linear guide rail installed on a left frame of the framework to correspond to the at least one first linear guide block and extending along the gap, and at least one second linear guide rail installed on a right frame of the framework to correspond to the at least one second linear guide block and extending along the gap.

* * * * *